US006789809B2

(12) United States Patent
Lin

(10) Patent No.: US 6,789,809 B2
(45) Date of Patent: Sep. 14, 2004

(54) PUSH CART TRANSFERABLE TO A BACK HOLDER OR A CHAIR

(76) Inventor: Ken Lin, P.O. Box No. 6-57, Chung-Ho, Taipei 235 (JP)

( * ) Notice: Subject to any disclaimer, the term of this patent is extended or adjusted under 35 U.S.C. 154(b) by 0 days.

(21) Appl. No.: 10/237,049

(22) Filed: Sep. 9, 2002

(65) Prior Publication Data

US 2004/0046342 A1 Mar. 11, 2004

(51) Int. Cl.[7] .............................................. B62B 1/12
(52) U.S. Cl. ................. 280/47.25; 280/47.18; 280/645; 280/652; 297/129; 403/97
(58) Field of Search .................... 188/19, 20, 1.12; 297/129, 118; 403/97, 98, 96, 83, 84; 280/47.25, 47.18, 47.17, 47.131, 47.33, 37, 639, 641, 645, 651, 652, 654, 655, 62

(56) References Cited

U.S. PATENT DOCUMENTS

| | | | | |
|---|---|---|---|---|
| 1,671,774 A | * | 5/1928 | McIntosh ..................... 16/35 R |
| 2,957,700 A | * | 10/1960 | Beaurline ................ 280/47.19 |
| 3,054,622 A | * | 9/1962 | Davis et al. ................. 280/645 |
| 3,997,213 A | * | 12/1976 | Smith et al. ................. 297/118 |
| 4,733,905 A | * | 3/1988 | Buickerood et al. ........ 297/129 |
| 4,824,167 A | * | 4/1989 | King ........................... 297/129 |
| 5,161,811 A | * | 11/1992 | Cheng ........................... 280/30 |
| 5,213,360 A | * | 5/1993 | Lin .............................. 280/648 |
| 5,306,027 A | * | 4/1994 | Cheng ........................... 280/30 |
| 5,356,197 A | * | 10/1994 | Simic .......................... 297/129 |
| 5,374,073 A | * | 12/1994 | Hung-Hsin ................... 280/30 |
| 5,533,654 A | * | 7/1996 | Holty et al. ................ 224/155 |
| 5,542,740 A | * | 8/1996 | Chang ......................... 297/129 |
| 5,765,665 A | * | 6/1998 | Cheng et al. ................. 188/20 |
| 5,769,431 A | * | 6/1998 | Cordova ..................... 280/1.5 |
| 5,863,055 A | * | 1/1999 | Kasravi et al. .......... 280/47.29 |
| 5,938,230 A | * | 8/1999 | Huang et al. ............... 280/650 |
| 6,082,757 A | * | 7/2000 | Lin ............................. 280/654 |
| 6,308,805 B1 | * | 10/2001 | Lan .............................. 188/20 |
| 6,375,200 B1 | * | 4/2002 | Harter ......................... 280/30 |
| 6,447,002 B1 | * | 9/2002 | Fang ........................... 280/646 |
| 6,547,324 B1 | * | 4/2003 | Ammann, Jr. .............. 297/129 |

* cited by examiner

Primary Examiner—Brian L. Johnson
Assistant Examiner—Jeffrey Restifo
(74) Attorney, Agent, or Firm—Troxell Law Office PLLC

(57) ABSTRACT

A push cart transferable to a back holder and a chair includes a pair of connecting mounts jointing a bottom frame and a back frame as well an angle adjusting device jointing with an upper frame and the back frame; wherein the angle adjusting device adjusts the rotation angle of the upper frame; the bottom frame displaces and positions vertically or horizontally in a concave slot of the connecting mount; the connecting mounts slide at a limited distance on a left and a right lateral tubes of the back frame so as to fulfill the embodiment of being a push cart, a back holder or a chair.

4 Claims, 12 Drawing Sheets

PUSH CART TRANSFERABLE TO A BACK HOLDER OR A CHAIR

BACKGROUND OF THE INVENTION

1) Field of the Invention

The present invention relates to a push cart transferable to a back holder or a chair, more particularly to a foldable device to be optionally assembled into a push cart, a back holder or a chair after a series of expansion and combination.

2) Description of the Prior Art

Accordingly, the structure of a prior art push cart can only function as a push cart, a back holder or a chair. In other words, a single chair can't be alternatively used as a back holder or a push cart.

Therefore, how to transfer a push cart into a back holder or a chair through a simple expansion and assembly is the research issue of the present invention.

SUMMARY OF THE INVENTION

The primary objective of the present invention is to provide a push cart transferable to a back holder and a chair for achieving the effect of functioning multiply by transferring one object into a push cart, a back holder or a chair through a simple expansion and assembly.

To enable a further understanding of the effect achieved by the features of the present invention, the brief description of the drawings below is followed by the detailed description of the preferred embodiment.

DETAILED DESCRIPTION OF THE PREFERRED EMBODIMENTS

Figure 1:
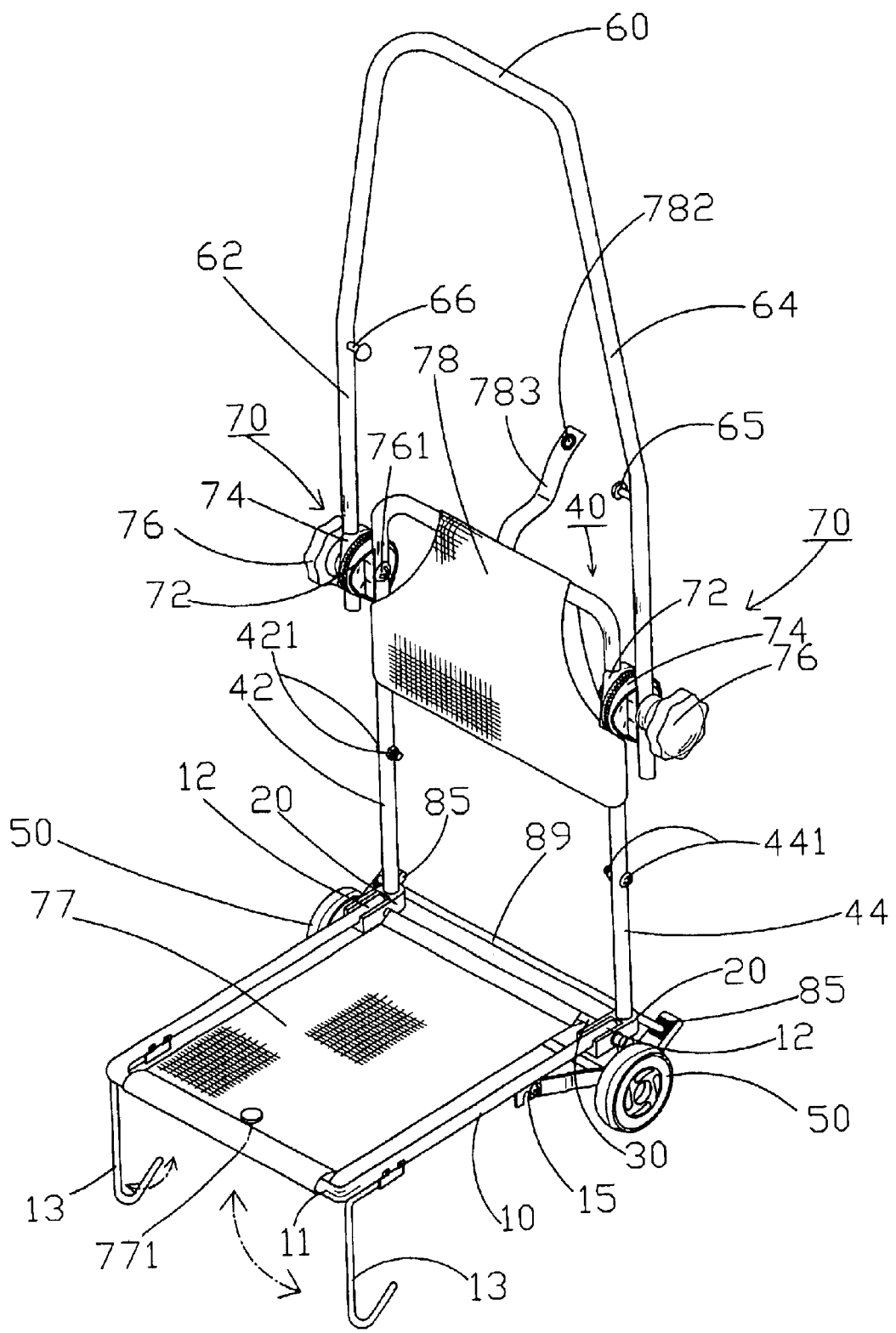
FIG. 1 is a pictorial drawing of a push cart of the present invention.
Figure 4:
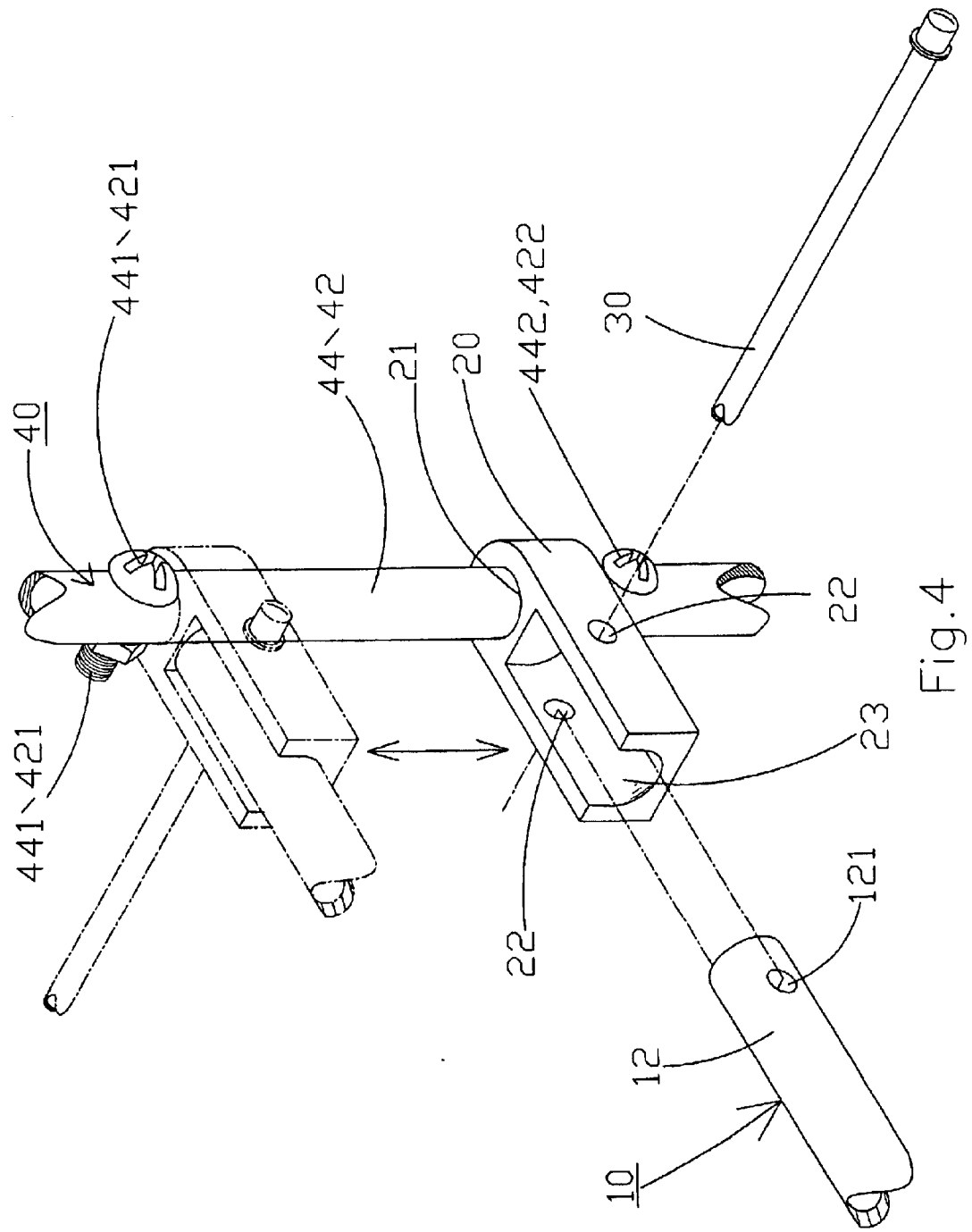
FIG. 4 is a pictorial and exploded drawing of a back frame and a bottom frame jointed at a connecting mount of the present invention.

FIG. 1 shows a pictorial drawing of a push cart of the present invention. As indicated, the present invention comprises a bottom frame (10) having two adjoining ends (12) disposed with transverse through holes (121) thereon, as shown in FIG. 4. Two connecting mounts (20) of a longitudinal through hole (21), the transverse through hole (22) and a concave slot (23) are disposed on the main body thereof; an adjoining end (12) of the bottom frame (10) is received inside the concave slot (23).

A shaft rod (30) penetrates into the transverse through hole (22) of the connecting mount (20) and the transverse through holes (121) of the adjoining ends (12) to allow the bottom frame (10) to rotate by using the shaft rod (30) as a turning shaft.

Upper retaining convex portions (421, 441) and lower retaining convex portions (422, 442) are respectively disposed at proper positions on lower segments of two left and right lateral tubes (42, 44) of a back frame (40); the left and right lateral tubes (42, 44) located between the upper and the lower retaining convex portions (421, 441, 422, 442) are movably connected into the longitudinal through holes (21) of the connecting mounts (20). A pair of turning wheels (50) are movably connected at the lower aspects of the left and right lateral tubes (42, 44).

Proper positions on lower segments of two left and right lateral tubes (62, 64) of an upper frame (60) are positioned slightly above the upper aspects of the left and right lateral tubes (42, 44) of the back frame (40) respectively through an angle adjusting device (70).

Figure 2A:
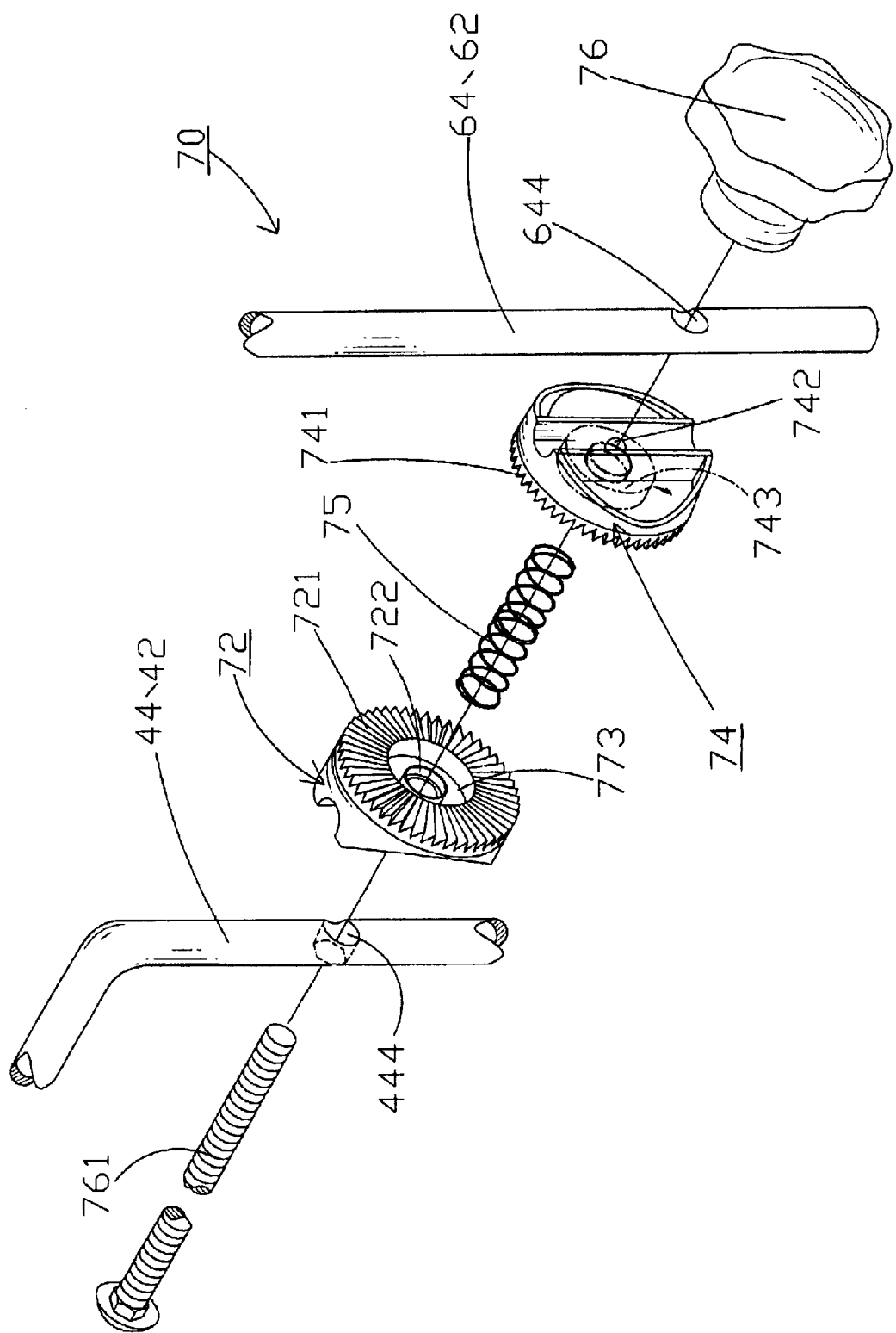
FIG. 2A is a pictorial and exploded drawing of members of an angle adjusting device of the present invention.
Figure 2B:
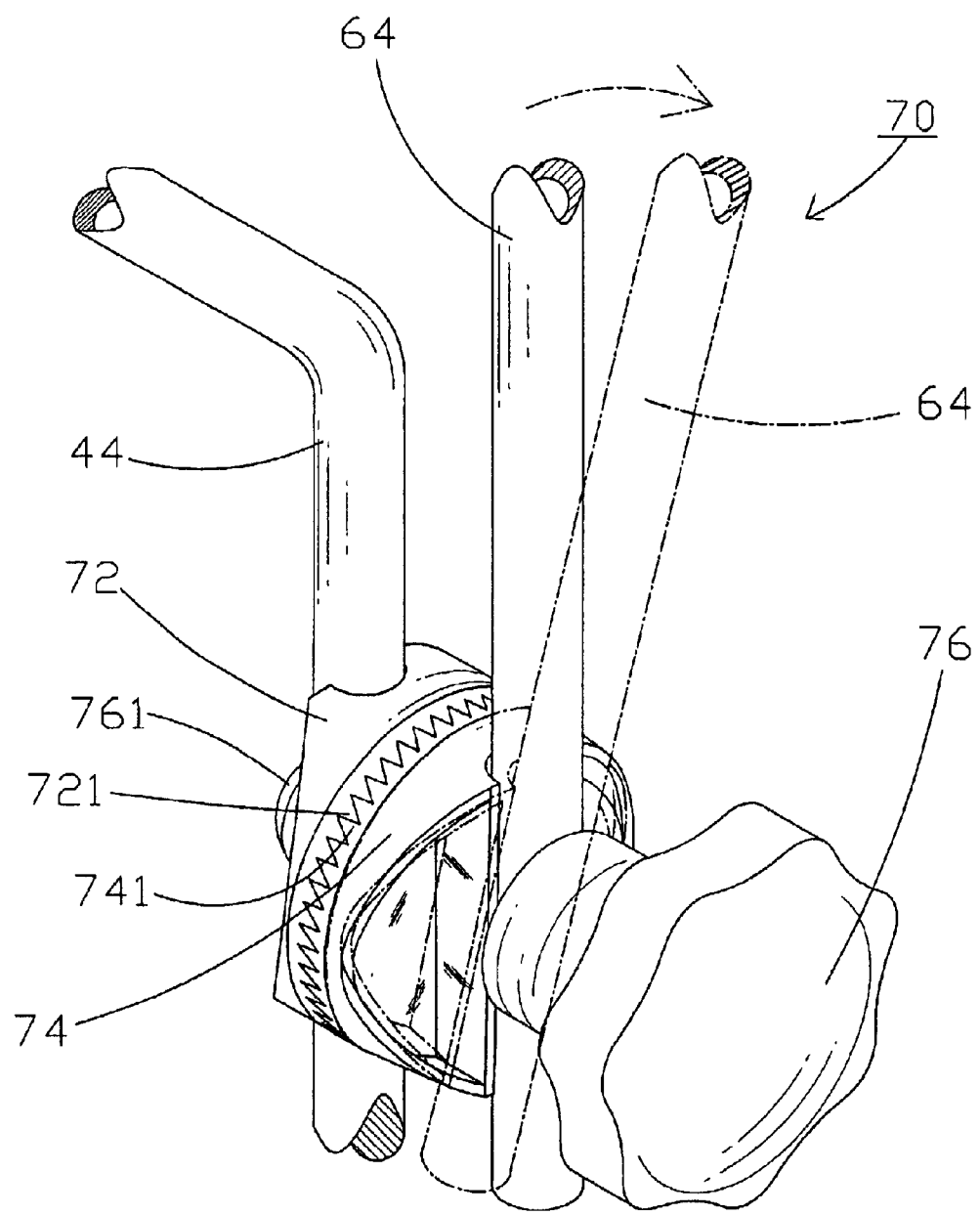
FIG. 2B is a pictorial drawing of the assembly of the angle adjusting device of the present invention.

According to the abovementioned main features, wherein the angle adjusting device (70), as shown in FIGS. 2A and 2B, comprises a left disk (72) and a right disk (74) with surfaces thereof disposed respectively with concavo-convex rim surfaces (721, 741); through holes (722, 742) are disposed at the circle center of the left and right disks (72, 74); outer peripheral rims on the hole walls of the through holes (722, 742) are formed as circular concave slots (773, 743); two ends of a spring (75) insert respectively into the circular concave slots (773, 743).

A screw rod (761) penetrates into predetermined through holes (444) of the left and right lateral tubes (42, 44) of the back frame (40), the central through holes (722, 742) of the left and right disks (72, 74), the spring (75) and through holes (644) on the left and right lateral tubes (62, 64) of the upper frame (60); furthermore, a nut (76) fixedly screws at the outer end of the screw rod (761). The optional mesh between the concavo-convex rim surfaces (721, 741) on the left and right disks (72, 74) adjusts the inclination degree between the upper frame (60) and the back frame (40).

According to the abovementioned main features, wherein front and rear rims of a seat cover (77) respectively connect with the shaft rod (30) and a front transverse rod (11) of the bottom frame (10). A back cover (78) is sleeved onto the back frame (40), wherein the backside of the back cover (78) is disposed with a back strap (781) and a long strap (783) having a male button (782) disposed at the front end thereof. A female button (771) is disposed on the bottom surface of the seat cover (77). The buckling of the male and female buttons (782, 771) positions the folded upper frame (60), the back frame (40) and the seat cover (77).

According to the abovementioned main features, wherein the position near the front segment at the lower aspect of the bottom frame (10) is disposed with a pair of foldable and expandable positioning frames (13). The folded positioning frame (13) affixes to the bottom surface of the seat cover (77). The lower aspects on two sides of the bottom frame (10) are disposed with concave portions (15) for retaining; the inner sides of the left and right lateral tubes (62, 64) of the upper frame (60) are disposed with convex posts (65, 66) to be optionally retained onto the convex portions (15).

Figure 3A:
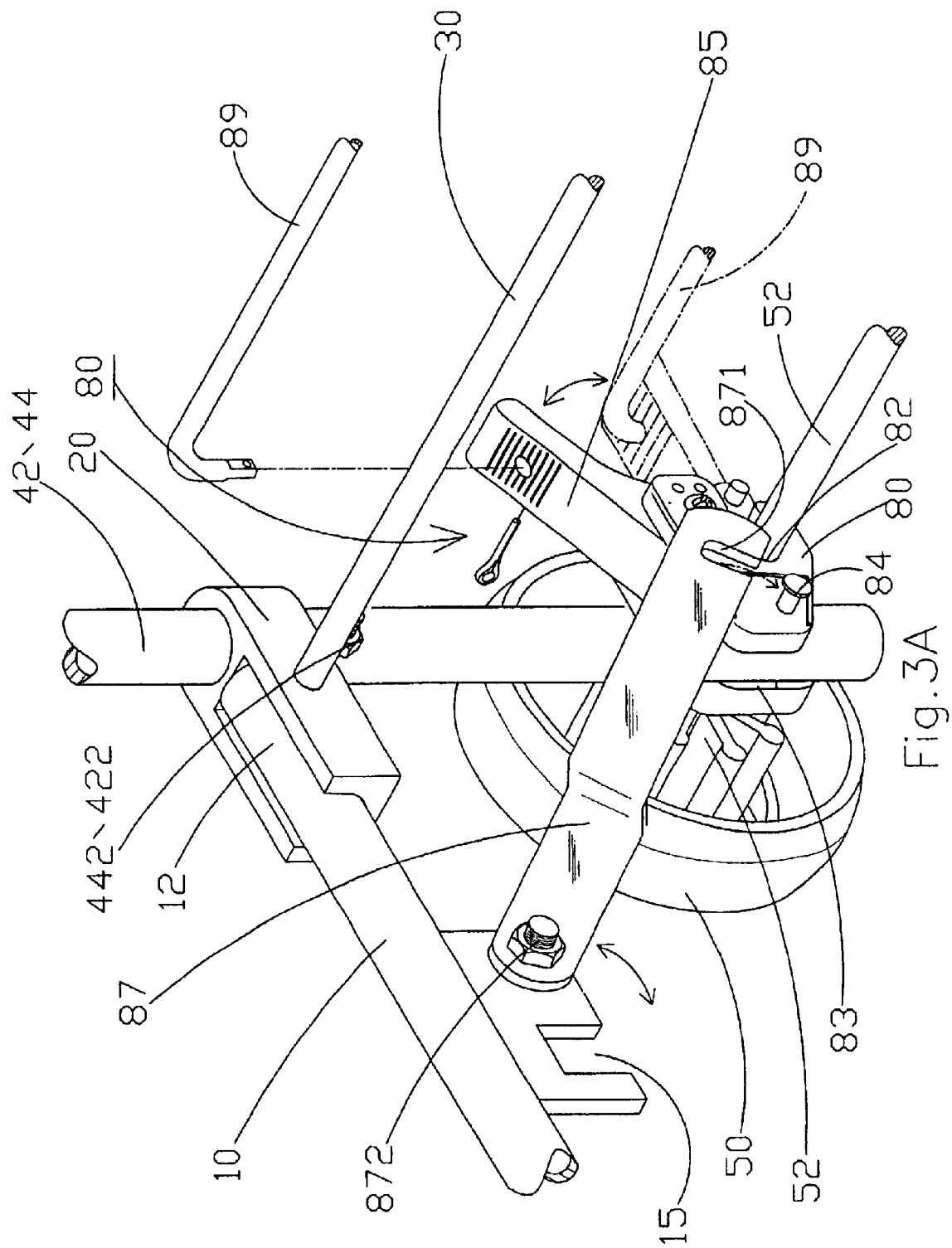
FIG. 3A is a pictorial drawing of the movement of a rocker arm retaining onto a convex rod on a lateral wall of a brake device.
Figure 3B:
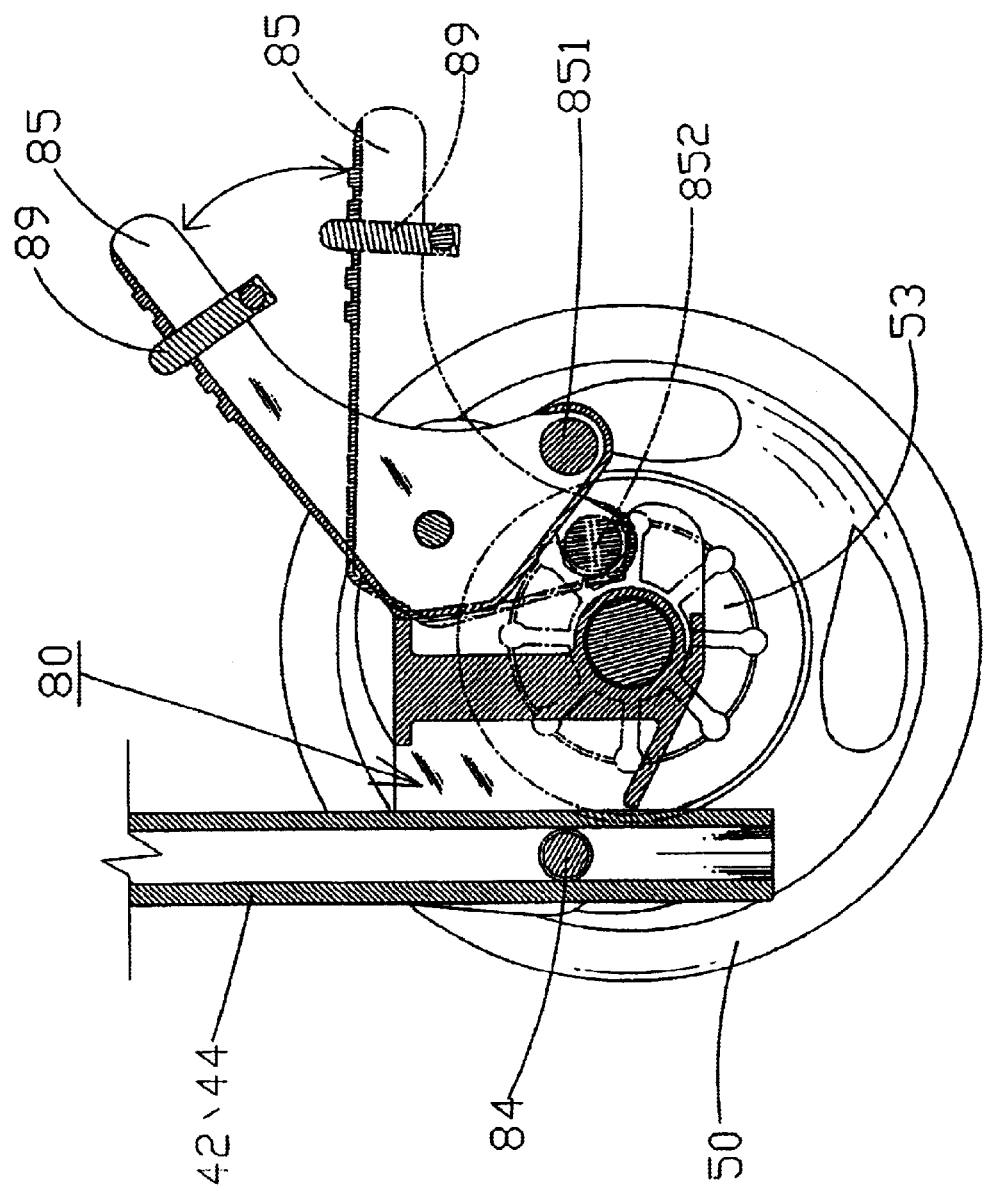
FIG. 3B is a partial cross-sectional and schematic drawing of the working between the brake device and a turning wheel of the present invention.

According to the abovementioned main features, wherein a turning shaft (52), as shown in FIG. 3, is disposed between the pair of turning wheels (50) to penetrate into a transverse through hole (82) of a brake device (80) thereby freely rotating therein. The brake device (80) is clamped fixedly by a clamp slot (83) of the main body thereof at the lower end of the left and right tubes (42, 44) of the back frame (40). The outer lateral wall of the brake device (80) is disposed with a convex rod (84) which penetrates transversely into the clamp slot (83) and further fixedly connects with the left and right lateral tubes (42, 44) of the back frame (40), as shown in FIG. 3.

A rocker arm (87) has a front end disposed with a concave portion (871) and a rear end movably connected to a proper position at the lower aspect of the bottom frame (10) through a shaft portion (872) to allow the rocker arm (87) to rotate at a certain angle by using the shaft portion (872) as a turning shaft thereby making the concave portion (871) to optionally retain onto the convex rod (84) at a proper time.

Exemplary Embodiment I:

FIG. 2A shows a pictorial and exploded drawing of the members of the angle adjusting device (70) connecting with the right lateral tubes (44, 64) of the present invention. Through the mesh between two concavo-convex rim surfaces (721, 741) and the screwing of the nut (76), as shown in FIGS. 1 and 2B, the upper frame (60) is fixed onto the back frame (40) via the angle adjusting device (70). When trying to adjust the inclination degree between the upper frame (60) and the back frame (40), it's only necessary to slightly rotate the nut (76) to loosen up such that the tension of the spring (75) separates the two concavo-convex rim surfaces (721, 741). At the meantime, when the left and right lateral tubes (62, 64) rotate, the right disk (74) rotates to a certain degree along with the left and right lateral tubes (62, 64). Then the nut (76) is tightly screwed to make the concavo-convex rim surface (741) rotate to a certain degree to mesh into the concavo-convex rim surface (721) of the left disk (72) so as to enable the upper frame (60) to position onto the angle adjusting device (70) at an inclination degree, as shown in an assumed line in FIG. 2B.

The positioning frame (13) shown in FIG. 1 expands vertically to the bottom frame (10) for supporting on the ground surface. Therefore, when the present invention is used as a push cart, it has the effect of making temporary pause. The rocker arm (87) shown in FIG. 3 rotates downwardly by using the shaft portion (872) as the shaft center thereby retaining the concave portion (871) onto the convex rod (84). The positioning of the rocker arm (87) enables the bottom frame (10) to obtain further support in order to increase the strength of force bearing thereof; wherein the penetrating clamp slot (83) disposed on the brake device (80) is for receiving and fixing the left and right lateral tubes (42, 44); the moving body (85) disposed on the brake device (80) is depressed downwardly to displace (as an shown in an assumed line position of the moving body (85) in FIG. 3B) to effectively brake the tuning wheel (50) and prevent it from making any movement; wherein the moving body (85) is movably jointed into the main body of the brake device (80); the inner wall of the moving body (85) connects with a transverse rod (851); the inner wall of the turning wheel (50) is disposed with a plurality of concave slots (53). The moving body (85) is depressed downwardly to rotate by using the shaft portion (852) as the center so as to retain the transverse rod (851) into the concave slot (53) to brake the turning wheel (50). When the moving body (85) rotates reversely to ascend, the transverse rod (851) departs from the concave slot (53); therefore, the turning wheel (50) looses the brake effect thereby rotating freely. The two moving bodies (85) of the brake device (80) respectively disposed at the lower aspects of the left and right lateral tubes (42, 44) connect with an n-shaped rod (89). When a user directly press down or lift the n-shaped rod (89), it synchronously drives two moving bodies (85) to displace up and down thereby synchronously controlling the two turning wheels (50) to brake or not.

Figure 5:
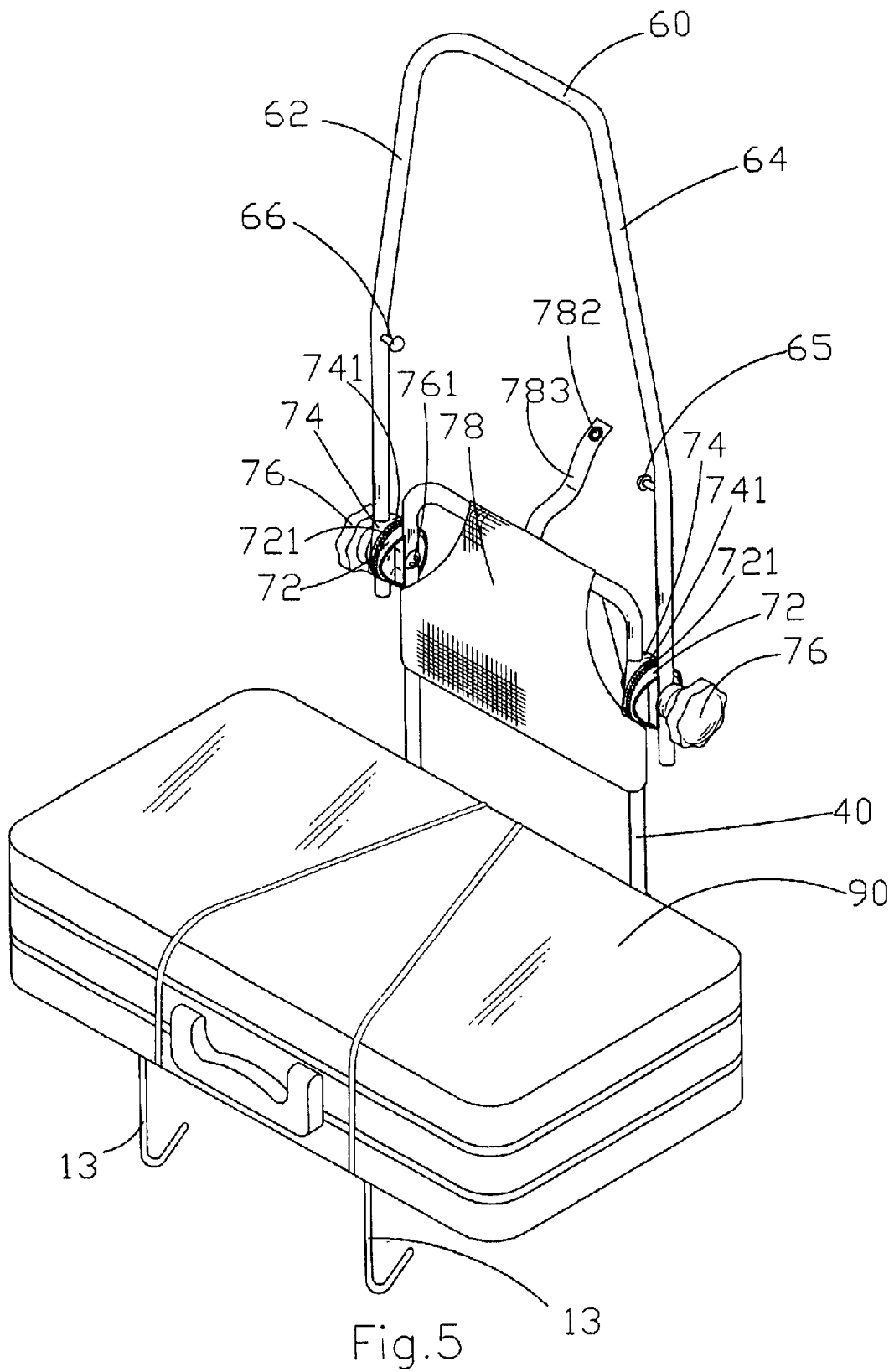
FIG. 5 is a pictorial drawing of the push cart of the present invention loaded with a trunk.

The FIG. 4 shows that the left and right lateral tubes (42, 44) slide into the longitudinal through holes (21) of the connecting mounts (20) such that the connecting mounts (20) are forced to slide on the lateral tubes (42, 44) between the upper retaining convex portions (421, 441) and the lower retaining convex portions (422, 442). The upper and lower retaining convex portions (421, 441, 422, 442) block the retaining to prevent the connecting mountings (20) from slide beyond the positions up and down. In addition, the bottom frame (10) rotates by using the shaft rod (30) as the center. FIG. 5 shows that a trunk (90) is tied onto the bottom frame (10) and the positioning frame (13) supports on the ground surface.

Figure 6:
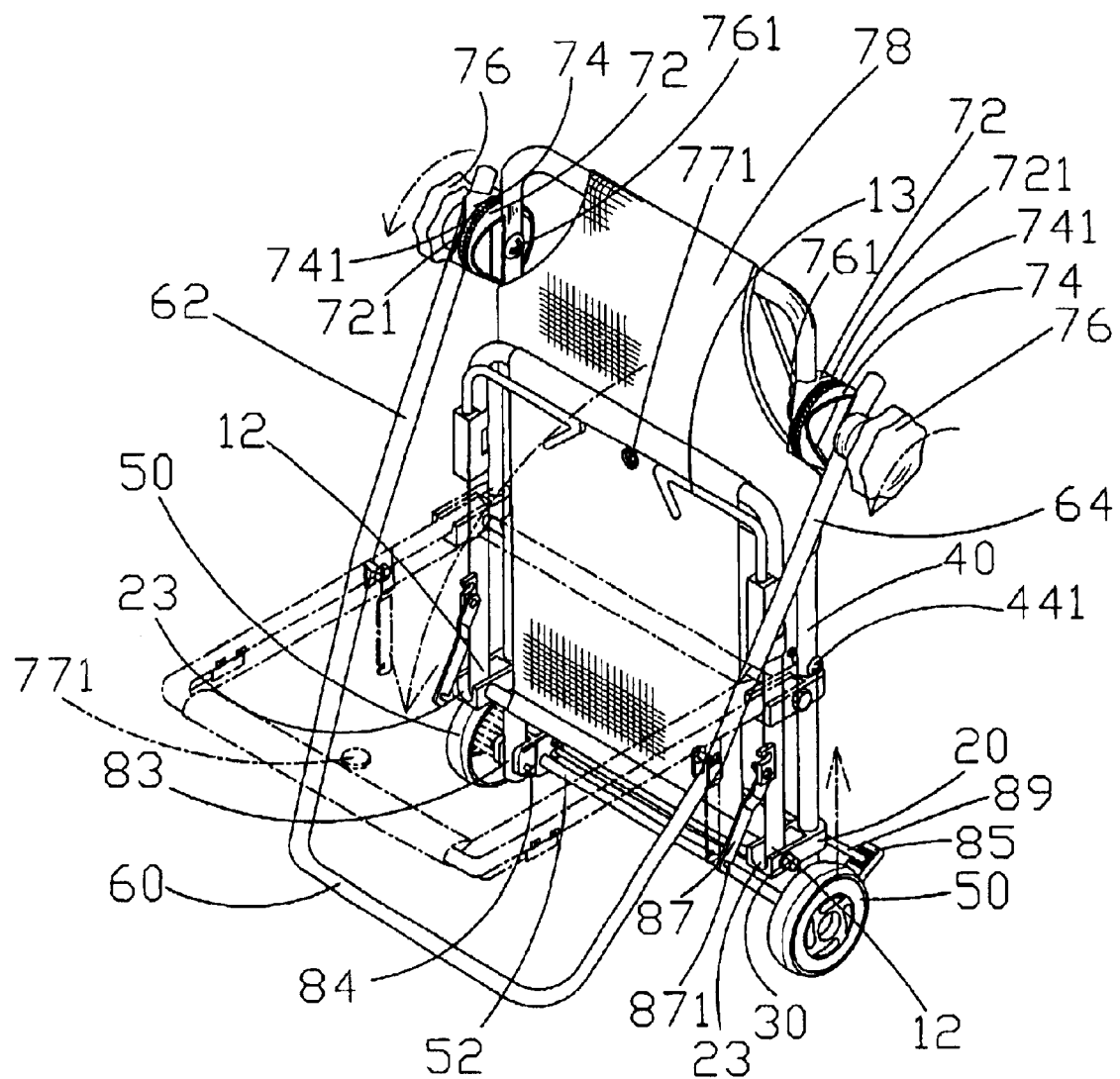
FIG. 6 is a pictorial drawing of the movement of transferring the present invention to a chair.
Figure 7:
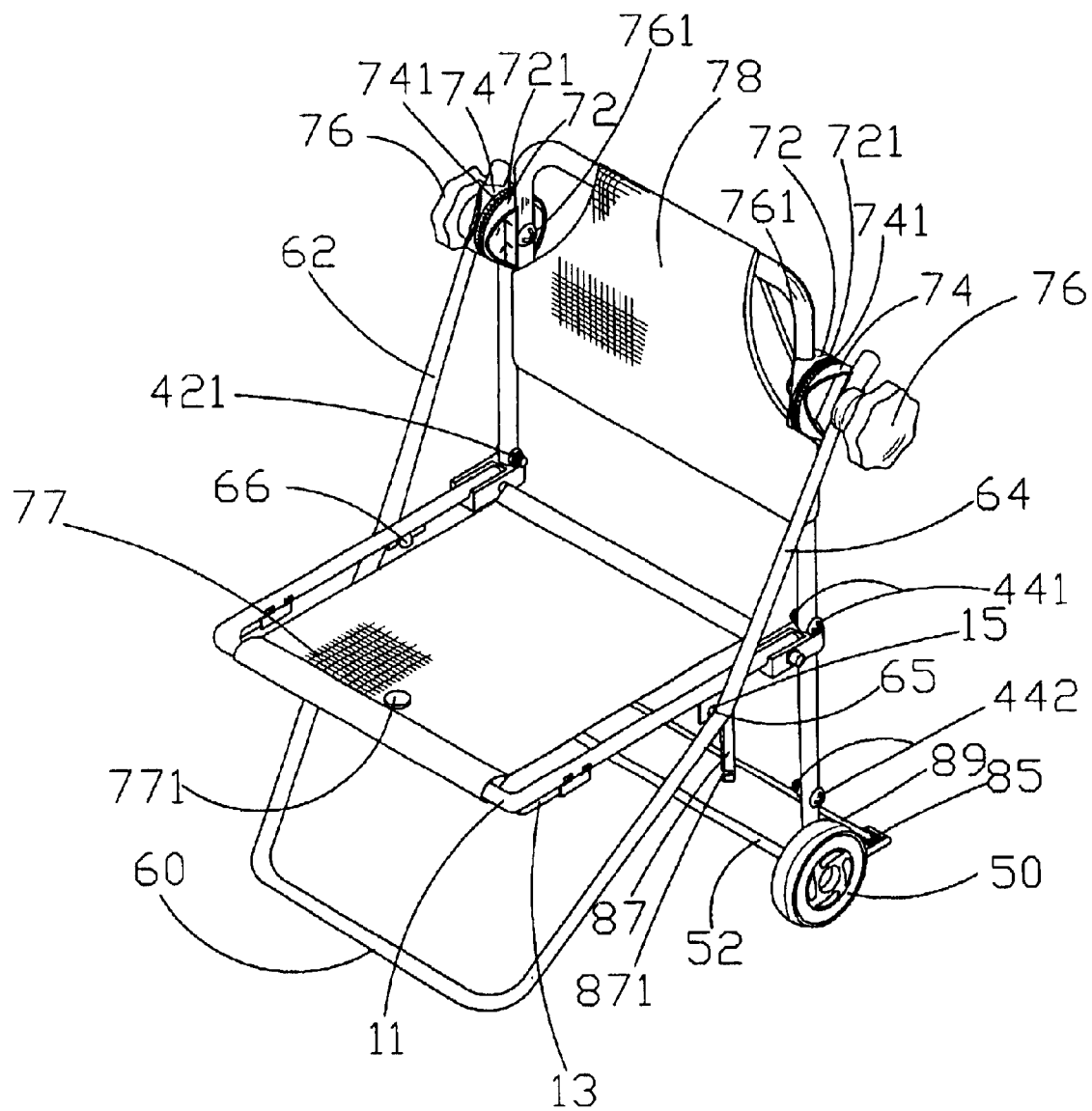
FIG. 7 is a pictorial drawing of the movement of transferring and positioning the present invention to a chair.

Exemplary Embodiment II of a Chair:

FIG. 6 shows the procedure of transferring the present invention to a chair. First, the nut (76) is loosened. The tension function of two springs (75) disconnects the two concavo-convex rim surfaces (721, 741), as shown in FIG. 2A. Moving the upper frame (60) make it sway downwardly by using the screw rod (761) as the center to further push the upper frame (60) against the ground surface. Then the nut (76) is tightened to fixedly screw the left and right lateral tubes (62, 64) to position on the right disk (74); two adjoining ends (12) of the bottom frame (10) use the shaft rod (30) as the turning shaft to rotate from an upright direction to a horizontal direction inside the concave slot (23). Therefore, the bottom frame (10) sways from an upright direction to a horizontal direction. Furthermore, the concave portions (15) retain into the concave posts (65, 66) such that the bottom frame (10) obtains a supportive positioning at a horizontal position; in addition, the connecting mounts (20) push against and retain at the upper retaining convex portions (421, 441) thereby making the bottom frame (10) have another supporting and positioning function. Then the moving body (85) is pressed downwardly to brake or stop the turning wheel (50). As shown in FIG. 7, at the meantime, the seat cover (77) is provided for a person's body to sit on and the back cover (78) is provided for the person's back to lean against. The positioning frame (13) is folded reversely into a slightly horizontal state.

Figure 8:
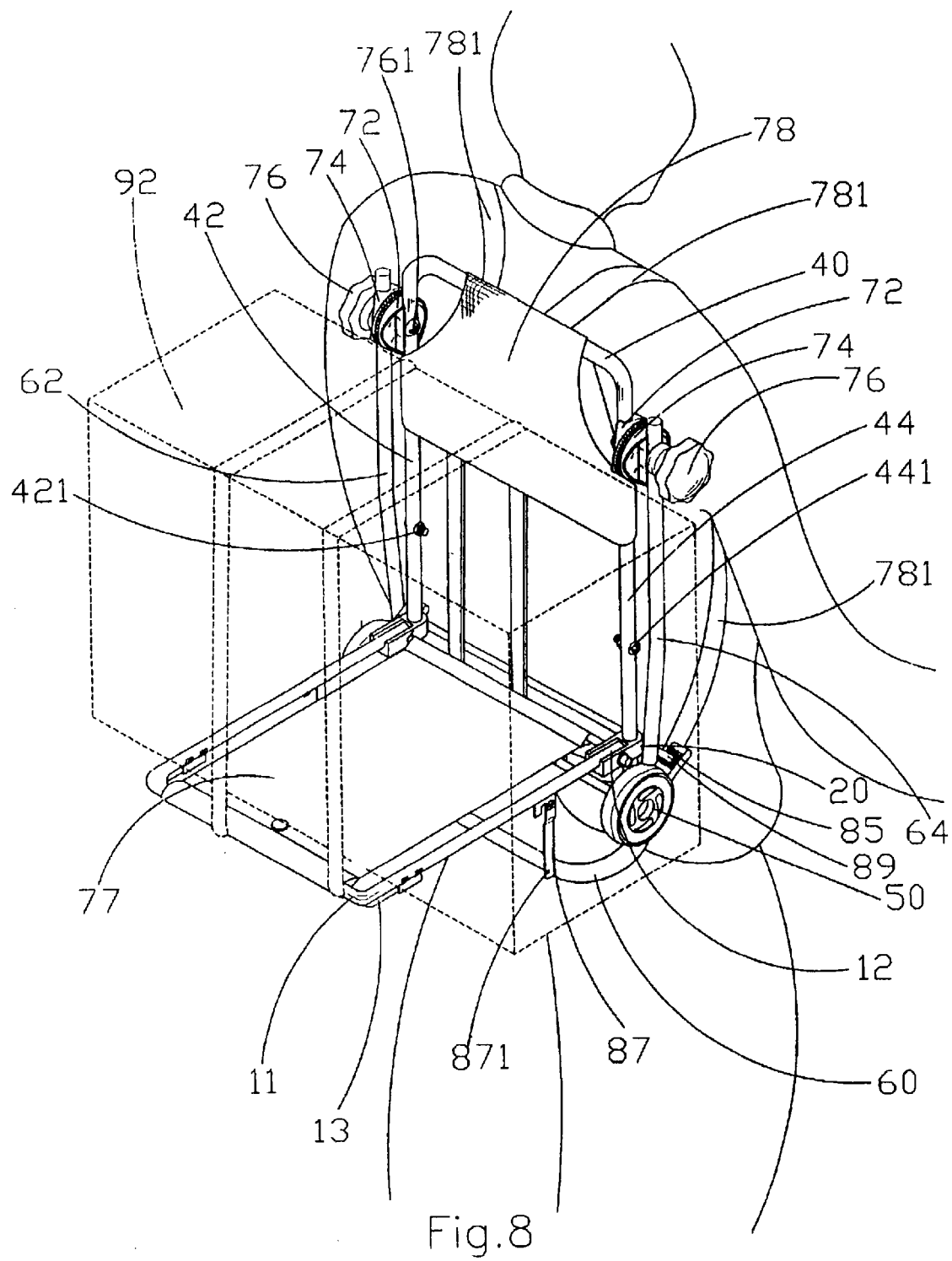
FIG. 8 is a pictorial and of an exemplary embodiment of transferring the present invention to a back holder.

Exemplary Embodiment III of a Back Holder:

In the embodiment of the chair structure shown in FIG. 7, the nut (76) is loosened to move the upper frame (60) to rotate reversely at a certain degree to form a back holder as indicated in FIG. 8. After the back holder is formed, the nut (76) is screwed tightly again. At this time, the upper frame (60) is in a folded state and a fixed object (92) is tied on the horizontal seat cover (77). The back strap (781) is inserted by a person's body for back carrying the entire frame. At the meantime, the positioning frame (13) is folded adjacent to the lower surface of the seat cover (77).

Figure 9:
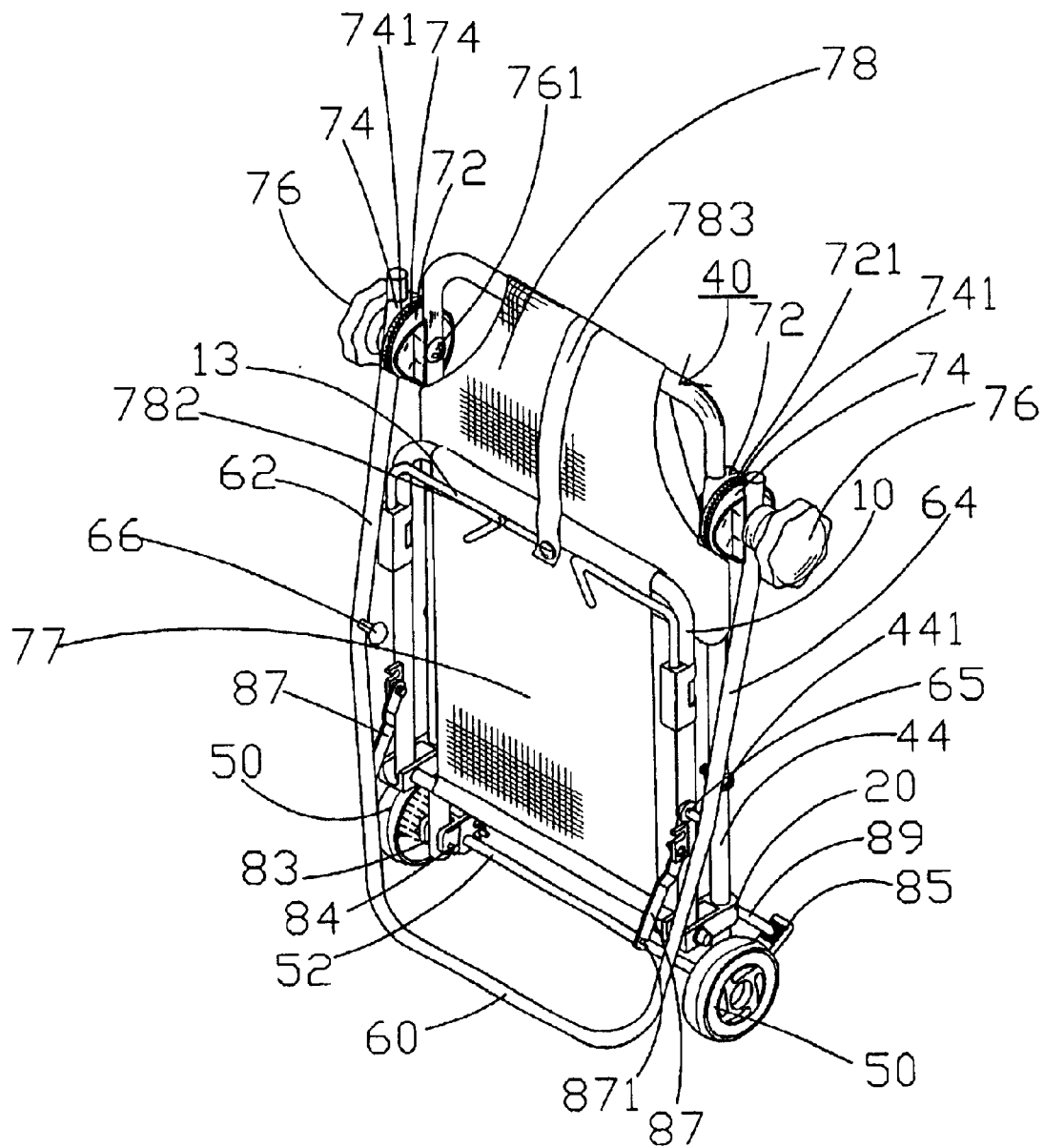
FIG. 9 is a pictorial drawing of the folded present invention.
Figure 10:
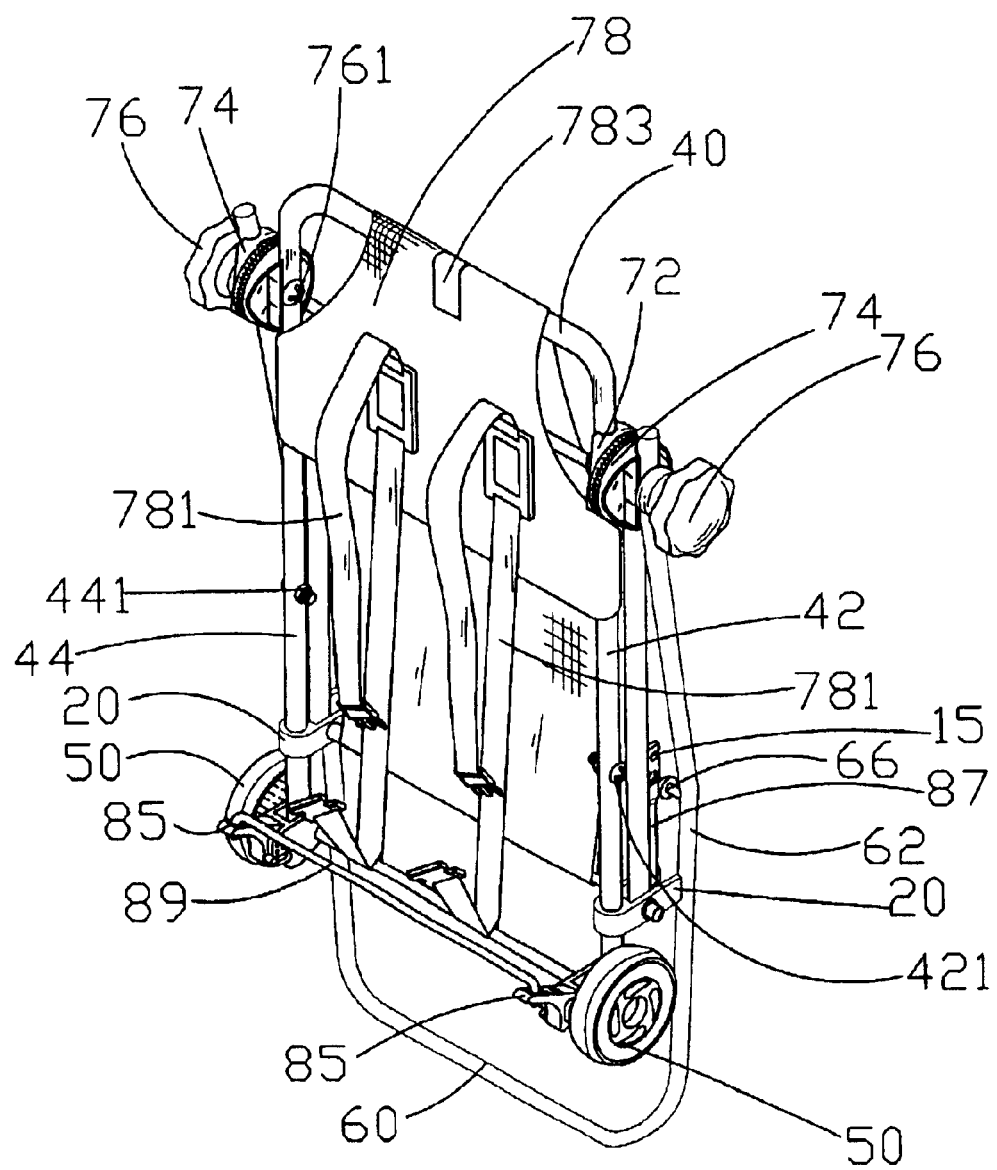
FIG. 10 is another pictorial drawing of the folded present invention.

Exemplary Embodiment IV of the Present Invention in a Folded Status Not For Application:

As indicated in FIGS. 9 and 10, the bottom frame (10) is folded at an upright direction to lean tightly to the back frame (40); the upper frame (60) is folded to make the left and right lateral tubes (62, 64) of the upper frame tightly lean against the lateral sides of the bottom frame (10) and the back frame (40); the positioning frame (13) is folded to tightly affix to the bottom surface of the seat cover (77). At this time, the male button (782) at the end portion of the long strap (783) buckles the female button (771) pre-disposed on the lower surface of the seat cover (77). Therefore, the bottom frame (10) and the back frame (40) won't sway freely. The nut (76) is screwed tightly to prevent the upper frame (60) from swaying freely. At the meantime, the long strap (783) is provided for a person's hand to grip for carrying the present invention.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A push cart transferable to a back holder and a chair comprises:

a bottom frame having two adjoining ends disposed with transverse through holes; two connecting mounts of a longitudinal through hole, the transverse through hole and a concave slot are disposed on a main body thereof; an adjoining end of the bottom frame is received inside the concave slot.

a shaft rod penetrates into the transverse through hole of the connecting mount and the transverse through holes of the adjoining ends to allow the bottom frame to rotate by using the shaft rod as a turning shaft;

upper retaining convex portions and lower retaining convex portions are respectively disposed on lower segments of two left and right lateral tubes of a back frame; the left and right lateral tubes located between the upper and the lower retaining convex portions are movably connected into the longitudinal through holes of the connecting mounts;

a pair of turning wheels are movably connected at the lower segments of the left and right lateral tubes;

on lower segments of two left and right lateral tubes of an upper frame are positioned slightly above the upper aspects of the left and right lateral tubes of the back frame respectively through an angle adjusting device, wherein a turning shaft is disposed between the pair of turning wheels to penetrate into a transverse through hole of a brake device thereby freely rotating therein; the brake device is clamped fixedly by a clamp slot of the main body thereof at the lower end of the left and right tubes of the back frame; an outer lateral wall of the brake device is disposed with a convex rod which penetrates transversely into the clamp slot and further fixedly connects with the left and right lateral tubes of the back frame;

a rocker arm has a front end disposed with a concave portion and a rear end movably connected at a lower aspect of the bottom frame through a shaft portion to allow the rocker arm to rotate by using the shaft portion as a turning shaft thereby making the concave portion to selectively retain on to the convex rod.

2. A push cart transferable to a back holder and a chair according to claim 1, wherein the angle adjusting device comprises:

a left disk and a right disk with surfaces thereof disposed respectively with concavo-convex rim surfaces; through holes are disposed at a circle center of the left and right disks; outer peripheral rims of hole walls of the through holes are formed as circular concave slots; two ends of a spring insert respectively into the circular concave slots;

a screw rod penetrates into predetermined through holes of the left and right lateral tubes of the back frame, the central through holes of the left and right disks, the spring and through holes on the left and right lateral tubes of the upper frame; furthermore, a nut fixedly screws at the outer end of the screw rod; the mesh between the concavo-convex rim surfaces on the left and right disks adjusts the inclination degree between the upper frame and the back frame.

3. A push cart transferable to a back holder and a chair according to claim 1, wherein front and rear rims of a seat cover respectively connect with the shaft rod and a front transverse rod of the bottom frame; a back cover is sleeved onto the back frame, wherein the backside of the back cover is disposed with a back strap and a long strap having a male, button disposed at the front end thereof; a female button is disposed on the bottom surface of the seat cover; the buckling of the male and female buttons positions the folded upper frame, the back frame and the seat cover.

4. A push cart transferable to a back holder and a chair according to claim 1, wherein the position near a front segment at a lower aspect of the bottom frame is disposed with a pair of foldable and expandable positioning frames; the folded positioning frame affixes to the bottom surface of a seat cover; the lower aspects on two sides of the bottom frame are disposed with concave portions for retaining; inner sides of the left and right lateral tubes of the upper frame are disposed with convex posts to be selectively retained onto the convex portions.

* * * * *